United States Patent [19]
Williams

[11] Patent Number: 5,844,758
[45] Date of Patent: Dec. 1, 1998

[54] TAPE CARTRIDGE REINSERTION DEVICE

[76] Inventor: Bishop R. L. Williams, 7 Howard St., Copiague, N.Y. 11726

[21] Appl. No.: 911,278

[22] Filed: Aug. 14, 1997

[51] Int. Cl.$^6$ .................................................. G11B 23/02
[52] U.S. Cl. ............................................................ 360/137
[58] Field of Search .................................... 360/93, 99.02, 360/99.03, 99.06, 99.07, 137; 369/77.2; 242/338, 339

[56] References Cited

U.S. PATENT DOCUMENTS

| | | | |
|---|---|---|---|
| 4,779,151 | 10/1988 | Lind et al. ................................ | 360/92 |
| 5,003,417 | 3/1991 | Grant ........................................ | 360/93 |
| 5,128,912 | 7/1992 | Hug et al. ............................. | 360/99.02 |
| 5,293,550 | 3/1994 | Toyoguchi et al. ....................... | 360/93 |
| 5,581,522 | 12/1996 | Sibuya et al. ............................. | 369/36 |

*Primary Examiner*—Stuart S. Levy
*Assistant Examiner*—David D. Davis
*Attorney, Agent, or Firm*—Bauer & Schaffer

[57] ABSTRACT

A VCR player tape cartridge reinsertion device for automatically reinserting a conventional tape cartridge back into a tape input slot in a conventional VCR player after the conventional tape cartridge has rewound and been partially ejected therefrom so as to allow the conventional tape cartridge to automatically record continuously without the need for an endless tape. The device includes a platform, a motor, an upright shaft, and at least one arm. The platform is positioned in close proximity to the tape input slot. The motor is disposed in the platform and has a shaft that extends vertically upwardly therefrom. The upright shaft is vertically-oriented and operatively connected to the shaft of the motor for rotation therewith. The at least one arm extends transversely outwardly from the upright shaft, and when rotated by the motor rotating the upright shaft, contacts and reinserts the conventional tape cartridge back into the tape input slot after the conventional tape cartridge has rewound and been partially ejected therefrom so as to allow the conventional tape cartridge to automatically record continuously without the need for the endless tape.

29 Claims, 5 Drawing Sheets

| STATE | COMMENT | $S_P$ | $S_1$ | $S_2$ | $S_3$ | $S_4$ | $X_1$ | $X_2$ | $X_3$ | X |
|---|---|---|---|---|---|---|---|---|---|---|
| 1 | Device unpowered | O | O | O | O | C | C | O | O | U |
| 2 | Device powered | C | O | O | O | C | C | O | O | U |
| 3 | Tape partially ejected | C | C | O | O | C | C | O | O | U |
| 4 | Motor sealed | C | C | C | O | C | C | O | O | U |
| 5 | Motor rotates in the one direction | C | O | C | O | C | C | O | O | U |
| 6 | Relay energized | C | O | C | C | C | C | O | O | E |
| 7 | Motor rotates in the opposite direction | C | O | C | C | C | O | C | C | E |
| 8 | Relay unenergized | C | O | C | C | O | O | C | C | U |
| 9 | Motor set to rotate in the one direction | C | O | C | O | O | C | O | O | U |
| 10 | Relay seal in contacts opened | C | O | C | O | C | C | O | O | U |
| 11 | Relay ready to be sealed | C | O | C | O | C | C | O | O | U |
| 12 | Device stops rotating | C | O | O | O | C | C | O | O | U |

KEY:

C = CLOSED   O = OPEN
E = ENERGIZED   U = UNENERGIZED

BOLD indicating change in state

*Fig. 7*

TAPE CARTRIDGE REINSERTION DEVICE

BACKGROUND OF THE INVENTION

The present invention relates to a VCR player tape cartridge reinsertion device. More particularly, the present invention relates to a VCR player tape cartridge reinsertion device for automatically reinserting a conventional tape cartridge back into a tape slot in a conventional VCR player after the conventional tape cartridge has rewound and been partially ejected from the tape slot in the conventional VCR player so as to allow the conventional tape cartridge to automatically record continuously without the need for an endless tape.

DESCRIPTION OF THE PRIOR ART

In home or commercial establishments, VCR players are used as part of security devices to record any intrusion. Expensive security devices employ endless loop recording tape and specially constructed VCR players. There is no inexpensive VCR tape system or system using conventional equipment.

SUMMARY OF THE INVENTION

Accordingly, an object of the present invention is to provide a VCR player tape cartridge reinsertion device that avoids the disadvantages of the prior art.

Another object of the present invention is to provide a VCR player tape cartridge reinsertion device that is simple and inexpensive to manufacture.

Still another object of the present invention is to provide a VCR player tape cartridge reinsertion device that is simple to use.

Briefly stated, yet another object of the present invention is to provide a VCR player tape cartridge reinsertion device for automatically reinserting a conventional tape cartridge back into a tape input slot in a conventional VCR player after the conventional tape cartridge has rewound and been partially ejected therefrom so as to allow the conventional tape cartridge to automatically record continuously without the need for an endless tape. The device includes a platform, a motor, an upright shaft, and at least one arm. The platform is positioned in close proximity to the tape input slot. The motor is disposed in the platform and has a shaft that extends vertically upwardly therefrom. The upright shaft is vertically-oriented and operatively connected to the shaft of the motor for rotation therewith. The at least one arm extends transversely outwardly from the upright shaft, and when rotated by the motor rotating the upright shaft, contacts and reinserts the conventional tape cartridge back into the tape input slot after the conventional tape cartridge has rewound and been partially ejected therefrom so as to allow the conventional tape cartridge to automatically record continuously without the need for the endless tape.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 7 is a logic chart for the asynchronous circuit of the present invention shown in FIG. 6.

DETAILED DESCRIPTION OF THE PREFERRED EMBODIMENT

Figure 1:
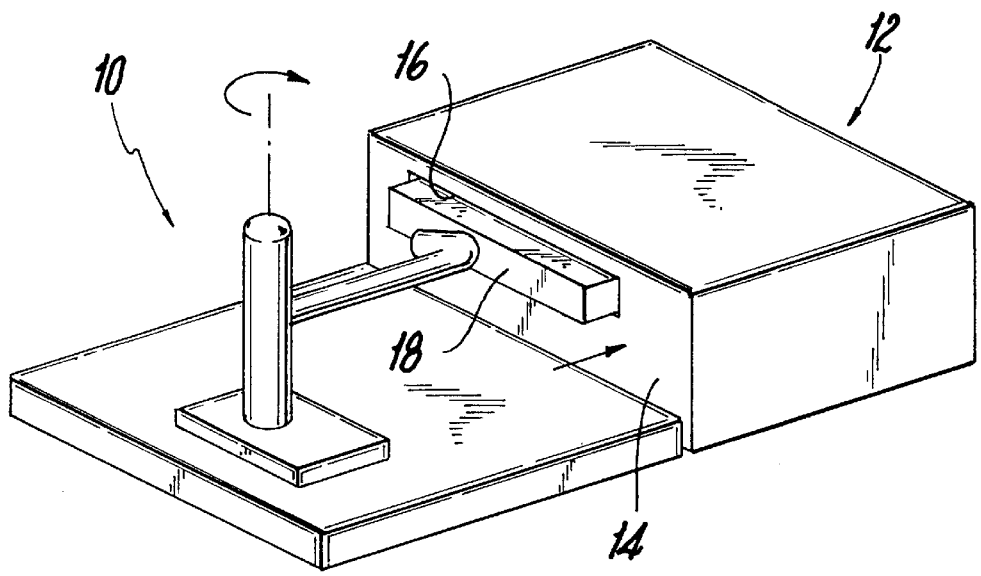
FIG. 1 is a diagrammatic perspective view of the present invention reinserting a conventional tape cartridge back into a tape input slot in a conventional VCR player.

Referring now to the figures in which like numerals indicate like parts, and particularly to FIG. 1, the VCR player tape cartridge reinsertion device of the present invention is shown generally at 10 separate from a conventional VCR player 12 that has a wall 14 with a tape input slot 16 therein and automatically reinserting a conventional tape cartridge 18 back into the tape input slot 16 in the wall 14 of the conventional VCR player 12 after the conventional tape cartridge 18 has rewound and been partially ejected therefrom so as to allow the conventional tape cartridge 18 to automatically record continuously without the need for an endless tape.

Figure 2:
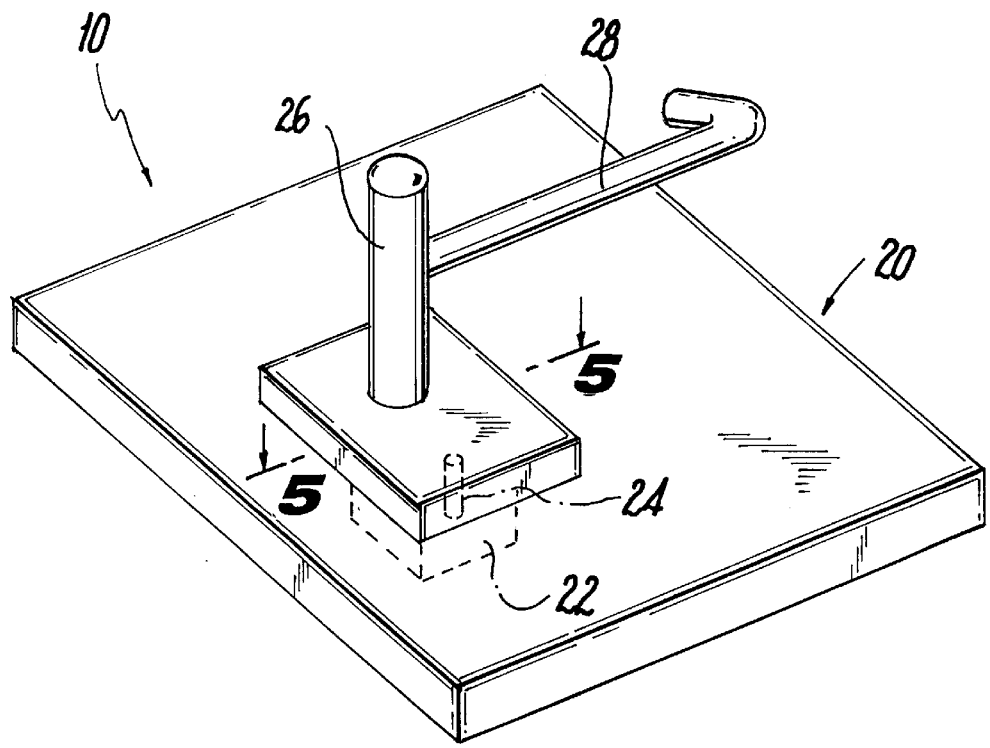
FIG. 2 is a diagrammatic perspective view of the present invention shown in FIG. 1.

The configuration of the VCR player tape cartridge reinsertion device 10 can best be seen in FIG. 2, and as such will be discussed with reference thereto.

The VCR player tape cartridge reinsertion device 10 includes a platform 20 that is positioned at the wall 14 of the conventional VCR player 12, a motor 22 that is disposed in the platform 20 and has a motor shaft 24 extending vertically upwardly therefrom, an upright shaft 26 that is vertically-oriented and operatively connected to the motor shaft 24 of the motor 22 for rotation therewith, at least one arm 28 that extends transversely outwardly from the upright shaft 26 and is level with the tape input slot 16 in the wall 14 of the conventional VCR player 12, and when rotated by the motor 22 rotating the upright shaft 26, contacts and reinserts the conventional tape cartridge 18 back into the tape input slot 16 in the wall 14 of the conventional VCR player 12 after the conventional tape cartridge 18 has rewound and been partially ejected therefrom so as to allow the conventional tape cartridge 18 to automatically record continuously without the need for the endless tape, and a gear box 30 that operatively connects the upright shaft 26 to the motor shaft 24 of the motor 22.

The motor 22 is preferably an AC reversible motor so as to allow the at least one arm 28 to rotate in an opposite direction and return back to its initial position after the at least one arm 28 has reinserted the conventional tape cartridge 18 back into the tape input slot 16 in the wall 14 of the conventional VCR player 12.

Figure 3:
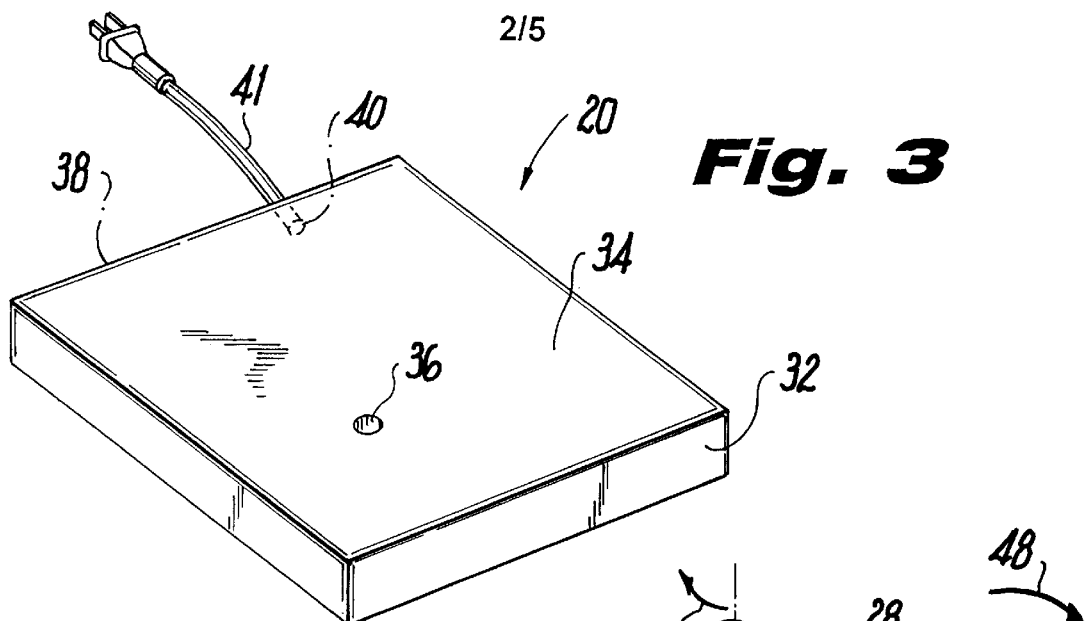
FIG. 3 is an enlarged diagrammatic perspective view of the platform of the present invention shown in FIG. 2.

The configuration of the platform 20 can best be seen in FIG. 3, and as such will be discussed with reference thereto.

The platform 20 is preferably generally rectangular-parallelepiped-shaped and has a front wall 32 that abuts against the wall 14 of the conventional VCR player 12, and whose presence maintains the upright shaft 26 a distance from the wall 14 of the conventional VCR player 12 that allows the at least one arm 28, when rotated by the motor 22 rotating the upright shaft 26, to contact and reinsert the conventional tape cartridge 18 back into the tape input slot 16 in the wall 14 of the conventional VCR player 12.

The platform 20 further has a top wall 34 with a motor shaft throughbore 36 that extends therethrough, through which the motor shaft 24 of the motor 22 extends, and a back wall 38 with a power wire throughbore 40 that extends therethrough, through which a power wire 41 extends.

Figure 4:
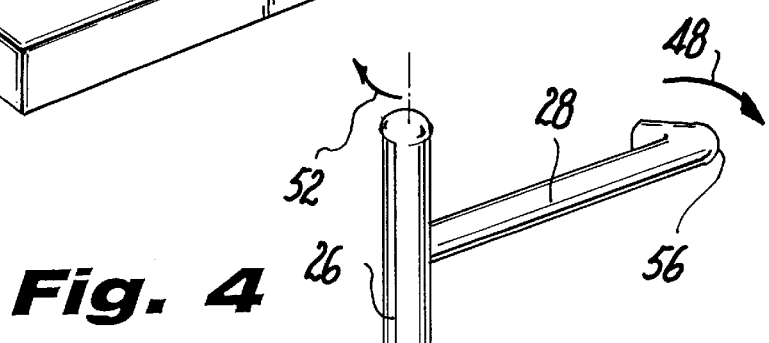
FIG. 4 is an enlarged diagrammatic perspective view of the upright shaft and the at least one arm of the present invention shown in FIG. 2.

The configuration of the upright shaft 26 and the at least one arm 28 can best be seen in FIG. 4, and as such will be discussed with reference thereto.

The upward shaft 26 is tubular and has three cam surfaces 42 at its base 44 that are longitudinally spaced there along. A first cam surface 46 of the three cam surfaces 42 on the upright shaft 26 assists in maintaining the at least one arm 28 rotating in one direction 48 for insertion of the conventional tape cartridge 18 back into the tape input slot 16 in the wall 14 of the conventional VCR player 12, a second cam surface 50 of the three cam surfaces 42 on the upright shaft 26 assists in rotating the at least one arm 28 in an opposite direction 52 back to its initial position after the at least one arm 28 has reinserted the conventional tape cartridge back 18 into the tape input slot 16 in the wall 14 of the conventional VCR player 12, and a third cam surface 54 of the three cam surfaces 42 on the upright shaft 26 terminates rotation of the at least one arm 28 after the at least one arm 28 has reinserted the conventional tape cartridge 18 back into the tape input slot 16 in the wall 14 of the conventional VCR player 12 and has returned back to its initial position.

The first cam surface 46 and the second cam surface 50 of the three cam surfaces 42 on the upright shaft 26 are offset relative to each other an amount dependent upon the desired angular travel of the at least one arm 28.

The at least one arm 28 is slender and rod-shaped and terminates in a lateral curl 56 so as to not damage, and jam against, the conventional tape cartridge 18 when it contacts and reinserts it back into the tape input slot 16 in the wall 14 of the conventional VCR player 12 and further to slide there off, after the conventional tape cartridge 18 has been reinserted back into the tape input slot 16 in the wall 14 of the conventional VCR player 12.

Figure 5:
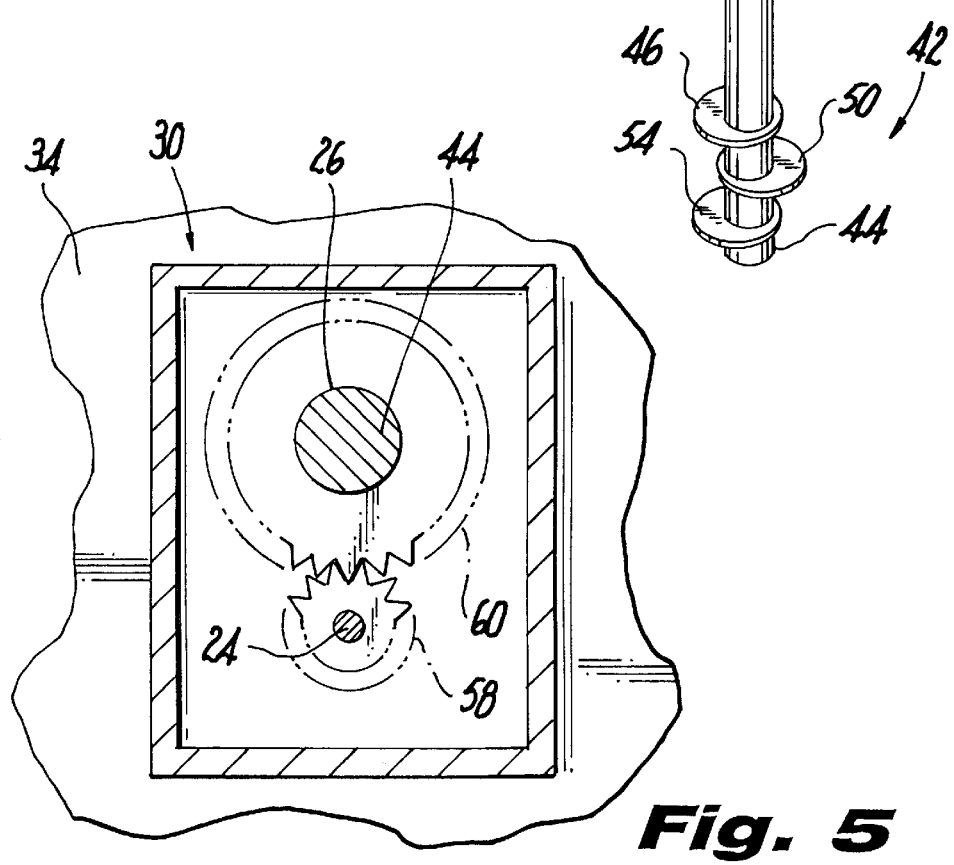
FIG. 5 is an enlarged diagrammatic cross sectional view of the gear box of the present invention taken on line 5—5 in FIG. 2.

The configuration of the gear box 30 can best be seen in FIG. 5, and as such will be discussed with reference thereto.

The gear box 30 is thin, horizontally-oriented, and generally rectangular-parallelepiped-shaped and is disposed on the top wall 34 of the platform 20, and overlies the motor shaft 24 of the motor 22. The gear box 30 contains a drive gear 58 that is small and horizontally-oriented and attached to the motor shaft 24 of the motor 22 for rotation therewith, and a driven gear 60 that is horizontally-oriented and attached to the upright shaft 26 at its base 44 for rotation therewith and is larger than the drive gear 58 so as to reduce the angular velocity of the motor 22.

Figure 6:
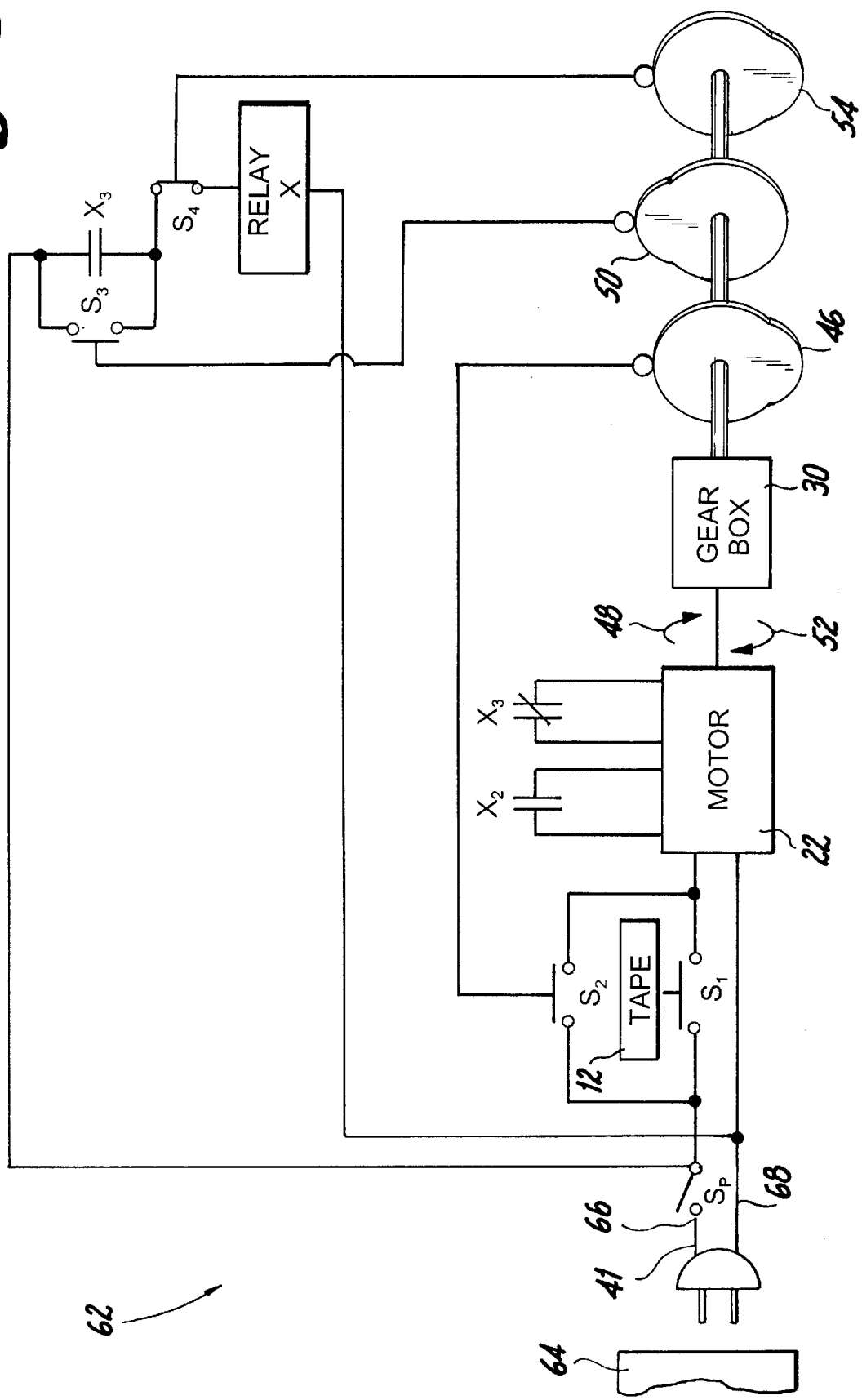
FIG. 6 is a schematic diagram of the asynchronous operating circuit of the present invention shown in FIG. 2.

The VCR player tape cartridge reinsertion device 10 includes an asynchronous operating circuit 62 that can best be seen in FIG. 6, and as such will be discussed with reference thereto.

The asynchronous operating circuit 62 includes the power wire 41 interfacing with an AC power source 64, with one leg 66 of the power wire 41 being in serial electrical communication with the motor 22 by a power switch $S_p$, which when closed, causes the VCR player tape cartridge reinsertion device 10 to be powered, and by a first microswitch $S_1$ that is in serial electrical communication with the power switch $S_p$ and which closes when the conventional tape cartridge 18 partially ejects and contacts it, and when closed, causes the motor 22 to start to rotate in the one direction 48 for reinsertion of the conventional tape cartridge 18 back into the tape input slot 16 in the wall 14 of the conventional VCR player 12.

The asynchronous operating circuit 62 further includes a second microswitch $S_2$ that is in parallel electrical communication with the first microswitch $S_1$ and operatively connected to the first cam surface 46, and when closed by the first cam surface 46, causes the motor 22 to be sealed-in and continue to rotate in the one direction 48.

The asynchronous operating circuit 62 further includes a DPDT relay X that reverses direction of rotation of the motor 22 and which is in electrical communication with the one leg 66 of the power wire 41 and the other leg 68 of the power wire 41. The DPDT relay X has contacts $X_1$, $X_2$, and $X_3$, with contacts $X_1$ and $X_2$ of the DPDT relay X being in electrical communication with the motor 22, and with the contact $X_3$ of the DPDT relay X being in serial electrical communication with the one leg 66 of the power wire 41.

The asynchronous operating circuit 62 further includes a third microswitch $S_3$ that is in parallel electrical communication with the contact $X_3$ of the DPDT relay X and operatively connected to the second cam surface 50, and when closed by the second cam surface 50, causes the motor 22 to rotate in the opposite direction 52.

The asynchronous operating circuit 62 further includes a fourth microswitch $S_4$ that is in serial electrical communication with the DPDT relay X and contact $X_3$ of the DPDT relay X and operatively connected to the third cam surface 54, and when opened by the third cam surface 54, causes rotation of the motor 22 to terminate.

Figure 8:
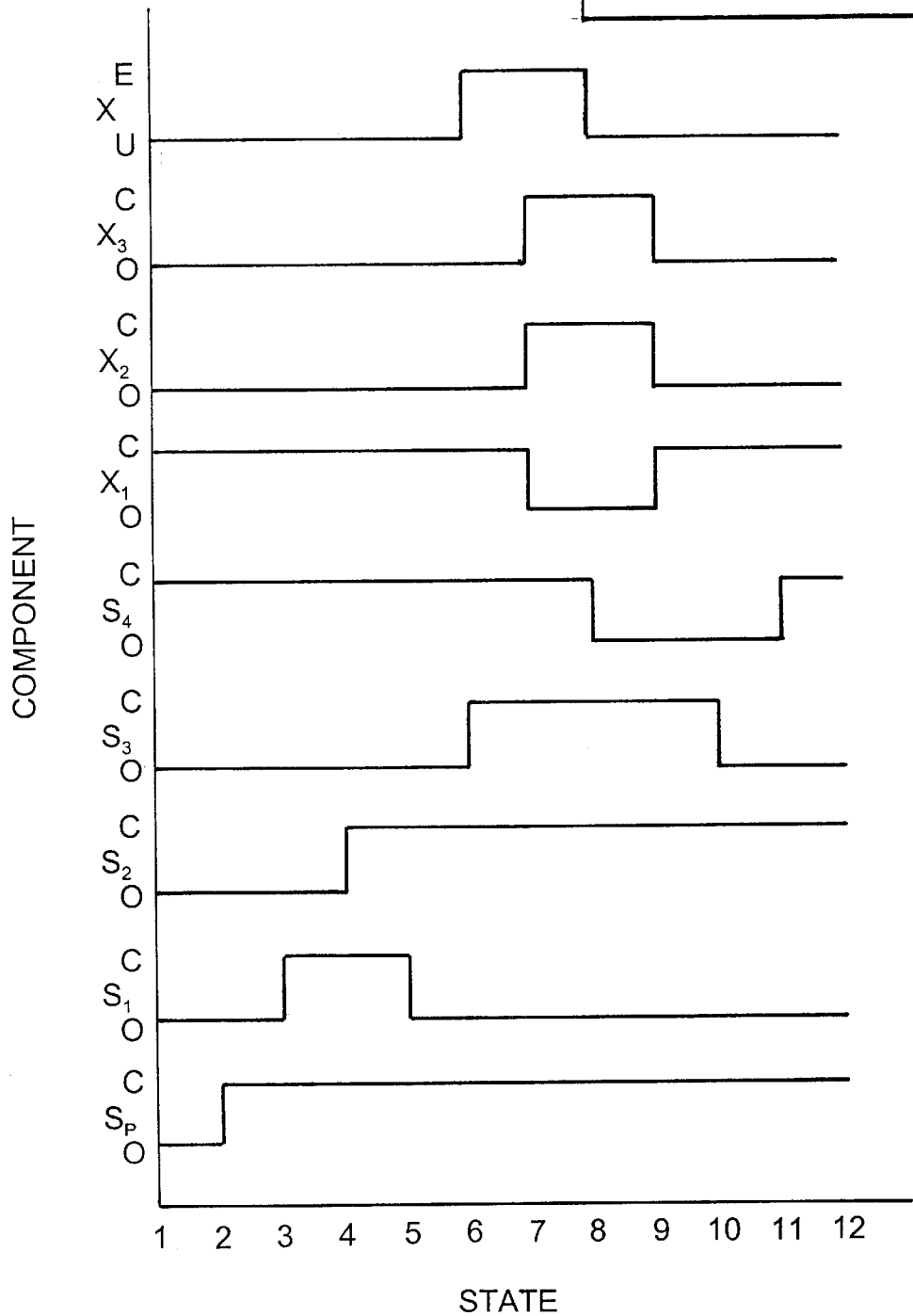
FIG. 8 is a timing diagram for the asynchronous circuit of the present invention shown in FIG. 6.

The operation of the VCR player tape cartridge reinsertion device 10 can best be seen in FIG. 7 and FIG. 8, and as such will be discussed with reference thereto.

As shown in State 1, initially, the power switch $S_p$ is open and the VCR player tape cartridge reinsertion device 10 is unpowered. The first microswitch $S_1$, the second microswitch $S_2$, the third microswitch $S_3$ the contact $X_2$ of the DPDT relay X, and the contact $X_3$ of the DPDT relay X are open, and the relay DPDT X is unenergized, while the fourth microswitch $S_4$ and the contact $X_1$ of the DPDT relay X are closed.

As shown in State 2, when the power switch $S_p$ is closed and the VCR player tape cartridge reinsertion device 10 is powered, the first microswitch $S_1$, the second microswitch $S_2$ the third microswitch $S_3$, the contact $X_2$ of the DPDT relay X, and the contact $X_3$ of the DPDT relay X still remain open, and the DPDT relay X is still unenergized, while the fourth microswitch $S_4$ and the contact $X_1$ of the DPDT X still remain closed.

As shown in State 3, when the tape cartridge 18 is partially ejected from the tape input slot 16 in the wall 14 of the conventional VCR player 12 it contacts and closes the first microswitch $S_1$ causing the motor 22 to begin to turn in the one direction 48.

As shown in State 4 and State 5, which occur instantaneously in sequence, the motor 22 continues to rotate causing the first cam surface 46 to close the second microswitch $S_2$ and seal the motor 22 in rotation in the one direction 48, with the conventional tape cartridge tape 18 being reinserted back into the tape input slot 16 in the wall 14 of the conventional VCR player 12 and loosing contact with, and opening, the first microswitch $S_1$.

As shown in State 6, when the motor 22 reaches its end of rotation in the one direction 48, the second cam 50 causes $S_3$ to close and energize the DPDT relay X.

As shown in State 7, the energized DPDT relay X pulls in and causes the contact $X_1$ of the DPDT relay X to open, and the contacts $X_2$ and $X_3$ of the DPDT relay X to close causing the motor 22 to rotate in the opposite direction 52.

As shown in State 8, when the motor 22 reaches its end of rotation in the opposite direction 52, the third cam 54 causes the fourth microswitch $S_4$ to open and unenergize the DPDT relay X.

As shown in State 9, State 10, State 11, and State 12, which occur instantaneously in sequence, the unenergized DPDT relay X drops out and causes the contact $X_1$ of the DPDT relay X to close, and the contacts $X_2$ and $X_3$ of the DPDT relay X to open causing the motor 22 to be set to rotate in the one direction 48. The third microswitch $S_3$ opens causing the relay's seal-in contacts to open, the fourth microswitch $S_4$ closes readying the DPDT relay X to be sealed, and the second microswitch $S_2$ opens and causes the VCR player tape cartridge reinsertion device 10 to stop rotating and be ready for its next use.

It will be understood that each of the elements described above, or two or more together, may also find a useful application in other types of constructions differing from the types described above.

For example, it is known to stack two or more VCR's one above the other and operate sequentially so as to record extra-long sessions on successive tapes. Thus, the upright shaft 26 can be provided with a plural number of rod shaped arms 28 so that when the final tape of the sequentially operated stack is played out, the tape reinsertion apparatus reinserts all of the tapes simultaneously.

It is also possible to provide multiple shafts 26 set concentrically one within the other (telescope fashion) so that each shaft 26 can be operated separately thereby reinserting multiple cartridges sequentially or in any selected order.

While the invention has been illustrated and described as embodied in a VCR player tape cartridge reinsertion device, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

Various modifications and changes have been disclosed herein, and others will be apparent to those skilled in this art. Therefore, it is to be understood that the present disclosure is by way of illustration and not limiting of the present invention.

What is claimed is:

1. A VCR player tape cartridge reinsertation device for automatically reinserting a tape cartridge back into a tape input slot in a wall of a VCR player after the tape cartridge has rewound and been partially ejected therefrom so as to allow the tape cartridge to automatically record continuously without the need for an endless tape, said device comprising:

a) a platform positioned at the wall of the VCR player;

b) a motor disposed in said platform and having a motor shaft extending vertically upward therefrom;

c) an upright shaft being vertically oriented and operatively connected to said motor shaft of said motor for rotation therewith;

d) at least one arm extending transversely outwardly form said upright shaft, said upright shaft being maintained on said platform at a distance form the wall of the VCR player that allows said at least one arm when rotated by said motor rotating said upright shaft, to contact and reinsert the tape cartridge back into the tape input slot in the wall of the VCR player after the tape cartridge has rewound and been partially ejected by the VCR player so as to allow the tape cartridge to automatically record continuously without the need for the endless tape; and e) sensing means for detecting the partial ejection of said tape cartridge from said VCR player, said sensing means for detecting providing a signal for causing the rotation of said motor in one direction to reinsert said tape cartridge into said VCR player and upon reinsertion of said tape cartridge to cause rotation of said motor in the other direction to disengage said arm form contact with said tape cartridge.

2. The device as defined in claim 1, wherein said platform is generally rectangular-parallelepiped-shaped.

3. The device as defined in claim 1, wherein said platform has a top wall with a motor shaft throughbore that extends therethrough, through which said motor shaft of said motor extends.

4. The device as defined in claim 1, wherein said platform has a back wall with a power wire throughbore that extends therethrough, through which a power wire extends for interfacing with an AC power source.

5. The device as defined in claim 1, wherein said motor is an AC reversible motor so as to allow said at least one arm to rotate in an opposite direction and return back to its initial position after said at least one arm has contacted and reinserted the tape cartridge back into the tape input slot in the wall of the VCR player.

6. The device as defined in claim 1, wherein said upright shaft is tubular.

7. The device as defined in claim 4, wherein said upright shaft has three cam surfaces at its base that are longitudinally spaced therealong.

8. The device as defined in claim 7, wherein a first cam surface of said three cam surfaces on said upright shaft assists in maintaining said at least one arm rotating in one direction for insertion of the tape back into the tape input slot in the wall of the VCR player, a second cam surface of said three cam surfaces on said upright shaft assists in rotating said at least one arm in an opposite direction to return it back to its initial position after said at least one arm has reinserted the tape cartridge back into the tape input slot in the wall of the conventional VCR player, and a third cam surface of said three cam surfaces on said upright shaft terminates rotation of said at least one arm after said at least one arm has reinserted the tape cartridge back into the tape input slot in the wall of the VCR player and has returned back to its initial position.

9. The device as defined in claim 8, wherein said first cam surface and said second cam surface of said three cam surfaces on said upright shaft are offset relative to each other an amount dependent upon desired angular travel of said at least one arm.

10. The device as defined in claim 1, wherein said at least one arm is slender, rod-shaped, generally level with the tape input slot in the wall of the VCR player, and terminates in a lateral curl so as to not damage, and jam against, the tape cartridge when it contacts and reinserts it back into the tape input slot in the wall of the VCR player and further to slide there off after the tape cartridge has been reinserted back into the tape input slot in the wall of the VCR player.

11. The device as defined in claim 3; further comprising a gear box operatively connecting said upright shaft to said motor shaft of said motor.

12. The device as defined in claim 11, wherein said gear box is thin, horizontally-oriented, and generally rectangular-parallelepiped-shaped.

13. The device as defined in claim 11, wherein said gear box is disposed on said top wall of said platform and overlies said motor shaft of said motor.

14. The device as defined in claim 11, wherein said gear box contains a drive gear that is small and horizontally-oriented and attached to said motor shaft of said motor for rotation therewith.

15. The device as defined in claim 14, wherein said gear box further contains a driven gear that is horizontally-oriented and attached to said upright shaft at its base for rotation therewith, and is larger than said drive gear so as to reduce the angular velocity of said motor.

16. The device as defined in claim 8; further comprising an asynchronous operating circuit that includes one leg of said power wire being in serial electrical communication with said motor by a power switch, which when closed, causes said VCR player tape cartridge reinsertion device to be powered, and by a first microswitch that is in serial electrical communication with said power switch and which closes when the tape cartridge partially ejects and contacts it, and when closed, causes said motor to rotate in said one direction for reinsertion of the tape cartridge back into the tape input slot in the wall of the VCR player.

17. The device as defined in claim 1, wherein said asynchronous operating circuit further includes a second microswitch that is in parallel electrical communication with said first microswitch and operatively connected to said first cam surface, and when closed by said first cam surface, causes said motor to be sealed in and continue to rotate in said one direction.

18. The device as defined in claim 17, wherein said asynchronous operating circuit further includes a DPDT relay for causing said motor to rotate in said opposite direction, and which is in electrical communication with said one leg of said power wire and said other leg of said power wire.

19. The device as defined in claim 18, wherein said DPDT relay has first, second, and third contacts, with said first and second contacts of said DPDT relay being in electrical communication with said motor, and with said third contact of said DPDT relay being in serial electrical communication with said one leg of said power wire.

20. The device as defined in claim 19, wherein said asynchronous operating circuit further includes a third microswitch that is in parallel electrical communication with said third contact of said DPDT relay and operatively connected to said second cam surface, and when closed by said second cam surface, causes said motor to rotate in said opposite direction.

21. The device as defined in claim 20, wherein said asynchronous operating circuit further includes a fourth microswitch that is in serial electrical communication with said DPDT relay and the third contact of said DPDT relay and operatively connected to said third cam surface, and when opened by said third cam surface, causes said motor to terminate rotation.

22. The device as defined in claim 21, wherein said asynchronous operating circuit further includes a first state wherein said power switch is open, said VCR player tape cartridge reinsertion device is unpowered, said first microswitch, said second microswitch, said third microswitch, said second contact of said DPDT relay, and said third contact of said DPDT relay are open, said DPDT relay is unenergized, and said fourth microswitch and said first contact of said DPDT relay are closed.

23. The device as defined in claim 22, wherein said asynchronous operating circuit further includes a second state wherein said power switch is closed and said VCR player tape cartridge reinsertion device is powered.

24. The device as defined in claim 23, wherein said asynchronous operating circuit further includes a third state wherein said first microswitch is closed causing said motor to begin to rotate in said one direction when the conventional tape cartridge is partially ejected from the tape input slot in the wall of the conventional VCR player and contacts, and closes, said first microswitch.

25. The device as defined in claim 24, wherein said asynchronous operating circuit further includes fourth and fifth states, which occur instantaneously in sequence, wherein said motor continues to rotate in said one direction causing said first cam surface to close said second microswitch and seal said motor in rotation in said one direction, with said at least one arm beginning to reinsert the tape cartridge tape back into the tape input slot in the wall of the conventional VCR player, and with the tape cartridge tape loosing contact with, and opening, said first microswitch.

26. The device as defined in claim 25, wherein said asynchronous operating circuit further includes a sixth state wherein said second cam causes said third microswitch to close and energize said DPDT relay when said motor reaches its end of rotation in said one direction.

27. The device as defined in claim 26, wherein said asynchronous operating circuit further includes a seventh state wherein said energized DPDT relay pulls in and causes said first contact of said DPDT relay to open and said second and third contacts of said DPDT relay to close causing said motor to rotate in said opposite direction.

28. The device as defined in claim 27, wherein said asynchronous operating circuit further includes an eighth state wherein said third cam causes said fourth microswitch to open and unenergize said DPDT relay when said motor reaches its end of rotation in said opposite direction.

29. The device as defined in claim 28, wherein said asynchronous operating circuit further includes ninth, tenth, eleventh, and a twelfth states, which occur instantaneously in sequence, wherein said unenergized DPDT relay drops out and causes said first contact of said DPDT relay to close and said second and third contacts of said DPDT relay to open causing said motor to be set to rotate in said one direction, said third microswitch opens causing seal-in contacts of said DPDT relay to open, said fourth microswitch closes readying said DPDT relay to be sealed, and said second microswitch opens and causes said VCR player tape cartridge reinsertion device to stop rotating and be ready for its next use.

* * * * *

UNITED STATES PATENT AND TRADEMARK OFFICE
CERTIFICATE OF CORRECTION

PATENT NO.    : 5,844,758
DATED         : December 1, 1998
INVENTOR(S)   : Bishop R.L. Williams It is certified that error appears in the above-identified patent and that said Letters Patent is hereby corrected as shown below:

Claim 1, column 6, line 23, change "form" to --from--;

Claim 16, column 7, line 33, after "to", insert --start to--;

Claim 24, column 8, line 20 and 22, delete "conventional";

Claim 25, column 8, line 32, delete "conventional".

Signed and Sealed this

Fourteenth Day of September, 1999

*Attest:*

Q. TODD DICKINSON

*Attesting Officer*     *Acting Commissioner of Patents and Trademarks*